United States Patent [19]
McNabb

[11] Patent Number: 4,934,587
[45] Date of Patent: Jun. 19, 1990

[54] DOCUMENT PROCESSING ENVELOPE

[75] Inventor: Rex P. McNabb, Dallas, Tex.

[73] Assignee: Check Savers, Inc., Garland, Tex.

[21] Appl. No.: 280,712

[22] Filed: Dec. 6, 1988

[51] Int. Cl.⁵ ............................................. B65D 27/04
[52] U.S. Cl. ..................................... 229/71; 235/487;
229/68 R
[58] Field of Search ................. 229/68 R, 71; 40/661,
40/359; 235/487, 493; 493/211, 220, 222

[56] References Cited

U.S. PATENT DOCUMENTS

| | | | |
|---|---|---|---|
| 3,043,506 | 7/1962 | Bremer | 229/68 R |
| 3,431,404 | 3/1969 | Brink | 229/68 R |
| 3,576,972 | 5/1971 | Wood et al. | 235/487 |
| 3,588,456 | 6/1971 | McNabb | 229/68 R |
| 3,593,913 | 7/1971 | Bremer | 229/68 R |
| 4,060,711 | 11/1977 | Buros | 235/493 |
| 4,128,202 | 12/1978 | Buros | 235/493 |
| 4,644,144 | 2/1987 | Chondek et al. | 235/487 |

Primary Examiner—Stephen P. Garbe
Attorney, Agent, or Firm—W. Kirk McCord

[57] ABSTRACT

An envelope for carrying returned or damaged checks and other documents through automated processing equipment is comprised of first and second rectangular, transparent sheets joined together along respective aligned edges at opposite ends of the envelope and a strip of opaque material, a first portion of which is sandwiched between the first and second sheets and a second portion of which is exposed for being encoded with information pertaining to the document being carried. The strip is thus securely attached to the envelope to resist tearing and other damage to the envelope during processing and sorting. A portion of the first sheet extends beyond the top edge of the second sheet to define a flap member, which is foldable over the top edge of the second sheet to seal the envelope. A release glue is disposed on the flap member for sealing the envelope when the glue is sandwiched between the flap member and the second sheet. The glue will adhere to the flap member, but not to the second sheet so that the flap member with the glue attached thereto can be disengaged from the remainder of the envelope to unseal the envelope and allow the document to be removed therefrom without glue residue getting on the document.

16 Claims, 2 Drawing Sheets

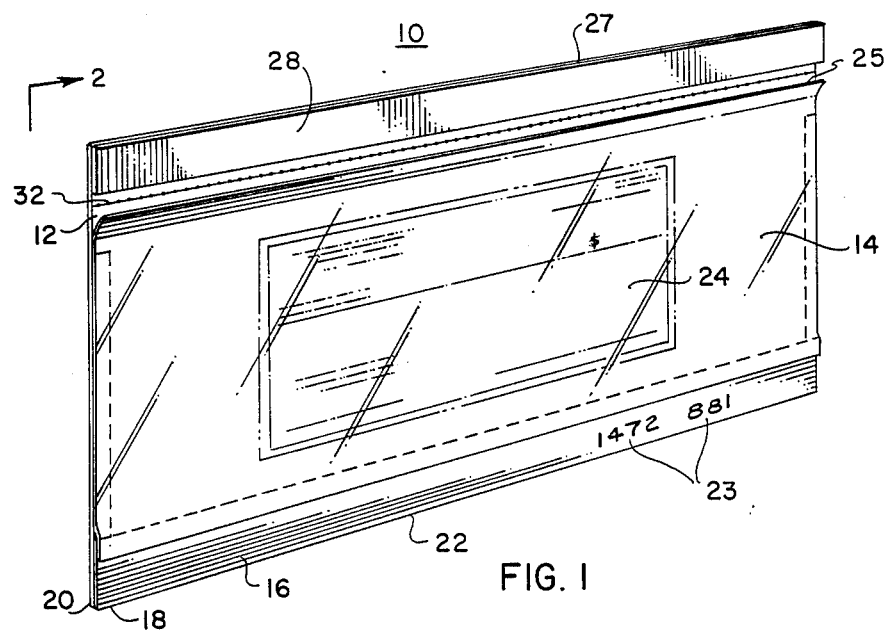
FIG. 1
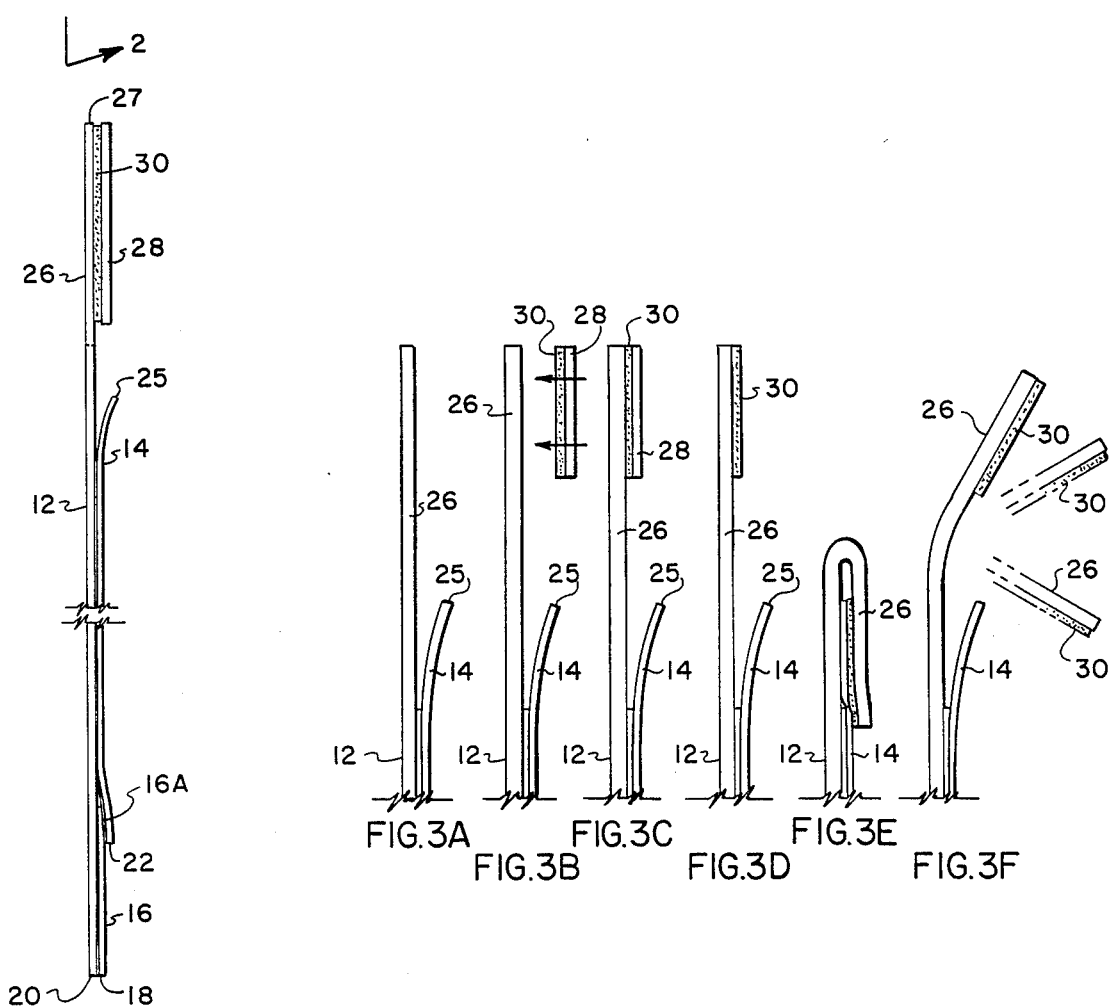
FIG. 2
FIG. 3A  FIG. 3B  FIG. 3C  FIG. 3D  FIG. 3E  FIG. 3F

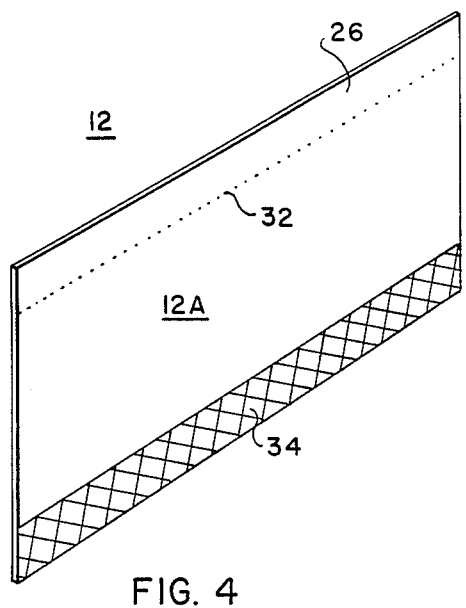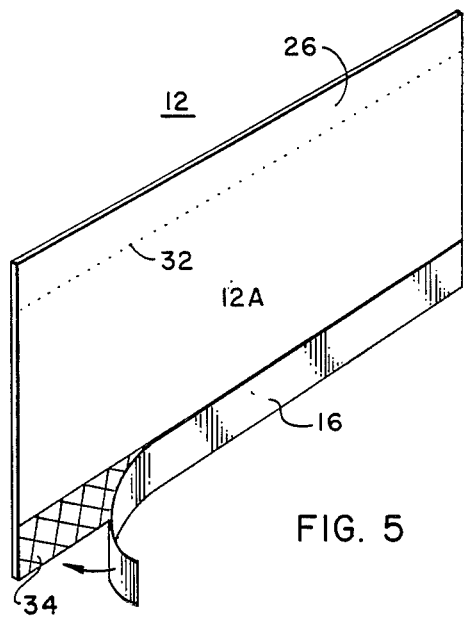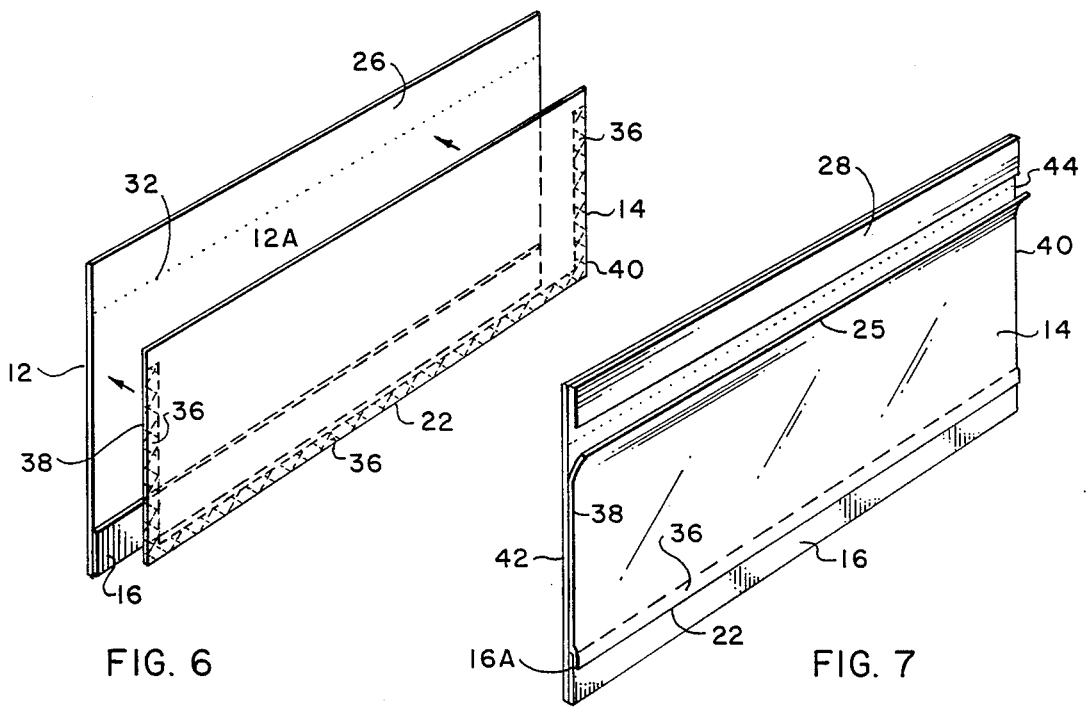

DOCUMENT PROCESSING ENVELOPE

FIELD OF THE INVENTION

This invention relates to document carriers and in particular to an envelope for carrying documents through data processing, including microfilming, reading and sorting equipment.

BACKGROUND OF THE INVENTION

Bank checks and other financial documents are typically coded at the bottom on the front surface thereof with magnetic ink to identify the bank, the depositor's account, and, when processed by computer, the amount of the check. In some instances, a check becomes damaged or the magnetic indicia obliterated to such extent that the data processing equipment cannot properly read the magnetic indicia and/or the check will not pass through the sorting equipment. Such defective documents can jam the sorting equipment, causing a back-up in the processing flow and damage to the documents being processed. In such instances special envelopes must be used to carry the defective documents through processing. Such envelopes are also used when a check is returned for non-sufficient funds by the drawee bank. Recent Federal Regulation CC requires all such returned checks to be maintained in sufficiently good condition to be processed by automated equipment at Federal Reserve banks, which necessitates the use of protective containers, such as carrier envelopes.

DESCRIPTION OF THE PRIOR ART

According to prior practice, carriers for documents such as returned checks and damaged checks are in commercial use to the extent of many millions per month. One such carrier is comprised of a transparent front sheet, which is secured to a substantially opaque back sheet along three edges thereof to define a substantially rectangular envelope for receiving a document. An adhesive material is disposed on an inner surface of the back sheet to secure the fourth edge of the transparent front sheet to the back sheet in order to seal the envelope after the document is inserted therein. A portion of the back sheet extends below the bottom edge of the front sheet to provide a strip for encoding information relating to the document contained in the envelope.

The envelope described above has several disadvantages. First, the back panel is opaque, which prevents reading equipment, such as an optical character reader, from reading the side of the document which faces toward the opaque sheet. Another disadvantage of this type of carrier envelope is that a residue of adhesive material is present on the inner surfaces of the front and back sheets, such that when the envelope is opened to remove the document, adhesive material may be deposited at least in part on the document, thereby defacing the document.

Another type of carrier envelope currently in use is comprised of two substantially rectangular, transparent sheets joined along three edges thereof to define an envelope for receiving a document therein. The use of transparent material on both the front and back sheets allows both sides of the document to be read and/or microfilmed by the processing equipment, without removing the document from the envelope. The encoding strip extends below the respective bottom edges of the front and back sheets.

This second type of carrier envelope also has several disadvantages. As previously mentioned, glue residue on the inner facing surfaces of the front and back sheets may adhere, at least in part, to the document. Another disadvantage is that there is a line of weakness at the intersection between the encoding strip and the respective bottom edges of the front and back sheets. Because the front and back sheets do not overlap any portion of the encoding strip, the strip tends to separate from the front and back sheets along the aforementioned line of weakness at the leading edge of the envelope, particularly after the envelope has been subjected to multiple processing and sorting steps.

OBJECTS OF THE INVENTION

It is, therefore, the principal object of the present invention to provide an improved carrier envelope for carrying returned or damaged checks and other documents through processing equipment.

Another object of the invention is to provide a carrier envelope for returned or damaged checks and other documents, which is sturdy enough to withstand multiple processing and sorting steps at multiple locations.

Still another object of the invention is to provide a protective envelope for returned checks and other documents, which substantially prevents damage and defacement of a document contained therein.

A further object of the invention is to provide a carrier envelope, which can be unsealed to allow removal of a document contained therein without adhesive material used to seal the envelope being deposited on the document.

SUMMARY OF THE INVENTION

These and other objects are accomplished in accordance with the present invention wherein a carrier envelope according to the present invention is comprised of first and second rectangular sheets of transparent material joined together along respective aligned edges at opposite ends of said envelope and a strip of opaque material, a first portion of which is sandwiched between the first and second sheets and a second portion of which is exposed along a bottom portion of the envelope.

In one embodiment the second portion of the strip extends beyond a first edge of the second sheet along substantially the entire length of the first edge. A distal edge of the strip is substantially coterminous with a first edge of the first sheet. In another embodiment a first adhesive material is disposed adjacent to the first edge of the first sheet for securing a first major surface of the strip thereto. A second adhesive material is disposed adjacent to the first edge of the second sheet for securing the first portion of a second major surface of the strip, opposite from the first major surface thereof, to the second sheet. The second adhesive material is also disposed adjacent to second and third opposite edges of the second sheet for joining the first and second sheets at respective opposite ends of the envelope. In the preferred embodiment, the first adhesive material is comprised of a cold temperature glue and the second adhesive material is comprised of a hot melt glue.

In another aspect of the invention, the first sheet has substantially the same length as the second sheet along a major axis of the envelope and has a greater width than the second sheet along a minor axis of the envelope such that a portion of a first sheet extends beyond a fourth edge of the second sheet, which is opposite from the first edge of the second sheet, to define a flap member of the envelope. The flap member has a strip of third adhesive material disposed thereon for securing the flap member to an outer major surface of the second sheet when the flap member is folded toward the second sheet, thereby sealing the envelope.

In one embodiment the flap member has a line of weakness extending along a major axis thereof, which defines a fold line along which the flap member is foldable and which allows the flap member to be disengaged from the remainder of the first sheet by tearing along the line of weakness. In another embodiment, a flexible band is provided for transferring the third adhesive material to the flap member. The band is placed over the flap member so as to sandwich the third adhesive material between the flap member and the band. The band is removable to expose the third adhesive material on the flap member and allow the envelope to be sealed. In the preferred embodiment, the third adhesive material is comprised of a release glue which will adhere to the flap member and not to the band when the band is removed and will also adhere to the flap member and not to the outer surface of the second sheet when the flap member is disengaged from the outer surface of the second sheet after having been secured thereto by the release glue.

BRIEF DESCRIPTION OF THE DRAWINGS

Further objects and advantages of the invention will be apparent from the Detailed Description and claims when read in conjunction with the accompanying drawings wherein:

FIG. 1 is a perspective view of an envelope according to the present invention, showing a document being carried therein;

FIG. 2 is an end view of the carrier envelope of FIG. 1;

FIGS. 3A–3F are partial end views of the carrier envelope, illustrating the sequence of steps by which the envelope is selectively sealed and unsealed; and FIGS. 4–7 are respective perspective views illustrating the construction of the carrier envelope according to the present invention.

DETAILED DESCRIPTION OF THE PREFERRED EMBODIMENT

In the description which follows like parts are marked throughout the specification and drawings, respectively. The drawings are not necessarily to scale and in some instances proportions have been exaggerated in order to more clearly depict certain features of the invention.

Referring to FIGS. 1 and 2, a carrier envelope 10 is comprised of first and second substantially rectangular, transparent sheets 12 and 14 and an opaque strip 16 at the bottom of envelope 10. Strip 16 is secured to an inner major surface of first sheet 12 such that distal edge 18 of strip 16 is substantially coterminous with bottom edge 20 of first sheet 12 at the bottom of envelope 10. As best seen in FIG. 2, a first portion 16A of strip 16 is sandwiched between first and second sheets 12 and 14 to provide three-ply thickness in a limited region of envelope 10. A second portion of strip 16 which extends below bottom edge 22 of second sheet 14 is exposed for receiving indicia 23 relating to a document 24, which is housed within envelope 10.

As shown in FIG. 1, envelope 10 is adapted for carrying returned or damaged checks and other financial documents through processing at banks and other financial institutions. Document 24 is inserted into envelope 10 through the open mouth thereof. After insertion of document 24, envelope 10 is secured, as will be described in greater detail hereinafter with reference to FIG. 3. A portion of first sheet 12 extends above top edge 25 of second sheet 14 to define a flap member 26 at the top of envelope 10. Top edge 27 of first sheet 12 extends beyond top edge 25 of second sheet 14 by approximately 9/16 inch.

Referring to FIG. 3, a flexible band 28 having a strip of first adhesive material 30 disposed on one surface thereof is applied to an inner major surface of flap member 26. As best shown in FIG. 3C, first adhesive material 30 is sandwiched between band 28 and flap member 26 such that band 28 covers first adhesive material 30 and prevents it from drying out until envelope 10 is ready to be sealed.

First adhesive material 30 is preferably a release glue, such as the release glue manufactured and sold by the 3M Corporation. Band 28 is preferably comprised of a transfer tape which transfers glue 30 to the surface of flap member 26 so that when tape 28 is removed, glue 30 will adhere to flap member 26 and not to tape 28, as shown in FIG. 3D. First sheet 12 and second sheet 14 are preferably comprised of 37 lb. Rhinelander type paper.

To seal envelope 10 after document 24 has been inserted therein, flap member 26 is folded downwardly in the direction of second sheet 14 so that flap member 26 overlaps top edge 25 of second sheet 14. Glue 30 is sandwiched between flap member 26 and an outer major surface of second sheet 14, thereby securing flap member 26 to second sheet 14 and sealing envelope 10. Referring again to FIG. 1, flap member 26 includes a line of perforation 32, which forms a line of weakness along flap member 26 to facilitate the folding of flap member 26.

When it is desired to open envelope 10 to remove document 24, flap member 26 can be disengaged from second sheet 14, as shown in FIG. 3F. The characteristics of glue 30 are such that glue 30 will continue to adhere to flap member 26 and will not leave a residue on the outer major surface of second sheet 14. Flap member 26 can be disengaged from the remainder of first sheet 12 by tearing along line of perforation 32 to remove the exposed glue 30 prior to removal of document 24 from envelope 10, thereby preventing glue 30 from being deposited on document 24 when document 24 is removed from envelope 10.

Referring to FIGS. 4–7, the construction of envelope 10 is depicted in detail. A strip of second adhesive material 34 is disposed along the bottom portion of first major surface 12A of first sheet 12 in the vicinity where opaque strip 16 is to be applied. Second adhesive material 34 is preferably comprised of a thermoplastic cold temperature glue. Opaque strip 16, which is preferably comprised of 15 lb microbond paper, is applied to adhesive material 34 so as to substantially cover second adhesive material 34, as shown in FIG. 5.

Referring to FIG. 6, strips of third adhesive material 36 are disposed along the perimeter of second sheet 14. Third adhesive material 36 is preferably comprised of a hot melt glue and is disposed along substantially the entire length of second sheet 14 adjacent to bottom edge 22 thereof and upwardly along substantial portions of respective opposite side edges 38 and 40 on a first major surface thereof. The first major surface of second sheet 14 is positioned in facing relationship with first major surface 12A of first sheet 12 as shown.

Referring to FIG. 7, the respective facing major surfaces of first and second sheets 12 and 14 are placed in facing relationship such that side edge 38 of second sheet 14 is aligned with corresponding side edge 42 of first sheet 12 and side edge 40 of second sheet 14 is aligned with corresponding side edge 44 of first sheet 12. Third adhesive material 36 is sandwiched between the respective facing major surfaces of first and second sheets 12 and 14 to join first and second sheets 12 and 14 together along respective strip portions thereof adjacent to respective aligned pairs of side edges 38, 42 and 40, 44. Third adhesive material 36 does not extend along the entire length of either side edge 38 or side edge 40 of second sheet 14 so that an upper portion of second sheet 14 adjacent to top edge 25 thereof can be pealed back to facilitate insertion of document 24 into and removal of document 24 from envelope 10. The strip of third adhesive material 36 extending along bottom edge 22 of second sheet 14 is placed in contact with first portion 16A of opaque strip 16 so that bottom edge 22 of second sheet 14 overlaps first portion 16A of strip 16, thereby sandwiching first portion 16A between first and second sheets 12 and 14, as previously described.

In this configuration strip 16 is securely fastened to envelope 10 to substantially increase the resistance of strip 16 to tearing and subsequent separation from envelope 10. Envelope 10 according to the present invention provides a secure enclosure for a check or other document contained therein and is sturdy enough to withstand the physical abuses attendant to processing the document through various types of reading and sorting equipment. After first and second sheets 12 and 14 and strip 16 have been joined together to define envelope 10, transfer tape 28, with release glue 30 disposed thereon, is applied to flap member 26, as previously described with reference to FIG. 3.

Although envelope 10 can be configured in any desired shape or size, first and second sheets 12 and 14 and strip 16 are preferably of the same length along a major axis of envelope 10. The typical length for envelope 10 is in the range from 6 inches to 9 inches. The width of first sheet 12 along a minor axis of envelope 10 is in the range of 3 ¾" to 4 ¾". The width of second sheet 14 is less than the width of first sheet 12 by an amount equal to the sum of the width of the exposed portion of strip 16 (i.e., approximately ⅜") plus the width of top flap member 26 (i.e., approximately 9/16"). In order to be compatible with conventional sorting and reading equipment used to process checks and other financial documents, the thickness of envelope 10, when empty, should not exceed 0.0095". The thickness of a typical document being processed is approximately 0.003" to 0.007". Thus the sorting and reading equipment must be capable of handling carrier envelopes with documents contained therein with combined thicknesses up to 0.0165".

Various embodiments of the invention have now been described in detail. Since it is obvious that changes in and additions to the above-described preferred embodiment may be made without departing from the nature, spirit and scope of the invention, the invention is not to be limited to said details, except as set forth in the appended claims.

What is claimed is:

1. A carrier envelope comprised of first and second substantially rectangular sheets of transparent material joined together along respective aligned edges at opposite ends of said envelope and a strip of opaque material, a first portion of which is sandwiched between said first and second sheets and a second portion of which is exposed along a bottom portion of said envelope.

2. The envelope according to claim 1 wherein the second portion of said strip extends beyond a first edge of said second sheet along substantially the entire length of said first edge, a distal edge of said strip being substantially coterminous with a corresponding first edge of said first sheet.

3. The envelope according to claim 1 wherein said envelope has a substantially oblong shape, the first sheet having substantially the same length as the second sheet along a major axis of the envelope and a greater width than the second sheet along a minor axis thereof, a portion of said first sheet extending beyond a second edge of said second sheet, opposite from the first edge of the second sheet, to define a flap member of said envelope.

4. The envelope according to claim 3 wherein said flap member has a line of weakness extending along a major axis of said envelope, said line of weakness defining a fold line along which said flap member is foldable, said flap member being disengagable from the remainder of said first sheet by tearing along said line of weakness.

5. The envelope according to claim 3 wherein said flap member has a strip of adhesive material disposed thereon, said flap member for being folded toward said second sheet so that said adhesive material contacts an outer major surface of said second sheet and secures said flap member thereto, thereby sealing said envelope.

6. The envelope according to claim 5 further including a flexible band covering said adhesive material, said band being removable to expose said adhesive material and allow said envelope to be sealed.

7. The envelope according to claim 6 wherein said band transfers said adhesive material to said flap member, said adhesive material being comprised of a release glue which adheres to said flap member, but not to said band when said band is removed.

8. The envelope according to claim 7 wherein said release glue adheres to said flap member, but not to the outer major surface of said second sheet when said flap member is disengaged from said second sheet after having been secured thereto by said release glue.

9. The envelope according to claim 1 wherein said first sheet has a strip of first adhesive material disposed thereon adjacent to the bottom portion of said envelope for securing a first major surface of said opaque strip thereto.

10. The envelope according to claim 9 wherein said first adhesive material is comprised of a thermoplastic cold temperature glue.

11. The envelope according to claim 9 further including strips of second adhesive material disposed adjacent to respective opposite edges of said second sheet for joining said first and second sheets together along said respective aligned edges of said first and second sheets and disposed adjacent to the bottom portion of said envelope for securing at least a portion of a second major surface of said opaque strip, opposite from the first major surface thereof, to said second sheet.

12. The envelope according to claim 11 wherein said second adhesive material is comprised of a thermoplastic hot melt glue.

13. A carrier envelope comprised of first and second rectangular sheets of transparent material joined together along respective aligned edges at respective opposite ends of said envelope and a strip of opaque material defining a bottom portion of said envelope, said first sheet having substantially the same length as said second sheet along a major axis of the envelope and a greater width than the second sheet along a minor axis thereof such that a portion of the first sheet extends beyond a top edge of said second sheet to define a flap member at a top portion of said envelope, said flap member being foldable toward said second sheet and having a strip of adhesive material disposed thereon for securing said flap member to said second sheet when said flap member is folded toward said second sheet, said flap member being disengagable from said second sheet such that said adhesive material will adhere to said flap member, but not to said second sheet.

14. The envelope according to claim 13 further including a flexible band covering said adhesive material, said band being removable to expose said adhesive material and allow said envelope to be sealed.

15. The envelope according to claim 14 wherein said flexible band transfers said adhesive material to said flap member, said adhesive material being comprised of a release glue which adheres to said flap member, but not to said flexible band when said band is removed from said flap member.

16. The envelope according to claim 13 wherein said flap member has a line of weakness extending along a major axis thereof, said line of weakness defining a fold line along which said flap member is foldable, said flap member being disengagable from the remainder of said first sheet by tearing along said line of weakness.

* * * * *